United States Patent [19]

Milton et al.

[11] 4,213,670
[45] Jul. 22, 1980

[54] PLANAR FIBER OPTIC STAR AND ACCESS COUPLER

[75] Inventors: A. Fenner Milton, Washington, D.C.; Thomas G. Giallorenzi, Springfield, Va.

[73] Assignee: The United States of America as represented by the Secretary of the Navy, Washington, D.C.

[21] Appl. No.: 841,859

[22] Filed: Oct. 6, 1977

[51] Int. Cl.$^2$ .............................................. G02B 5/14
[52] U.S. Cl. .................................................. 350/96.16
[58] Field of Search ............... 350/96.16, 96.15, 96.17, 350/96.20, 96.21, 96.22

[56] References Cited

U.S. PATENT DOCUMENTS

| | | | |
|---|---|---|---|
| 3,874,781 | 4/1975 | Thiel | 350/96.16 |
| 3,901,582 | 8/1975 | Milton | 350/96.16 |
| 3,902,786 | 9/1975 | Brown | 350/96.16 |
| 4,021,097 | 5/1977 | McMahon | 350/96.15 |
| 4,139,259 | 2/1979 | Kersten et al. | 350/96.16 |

OTHER PUBLICATIONS

Altman "Fiber Optics Applications in the Shipboard Data Multiplex System" NELC/TR 1995 Aug. 1976, pp. 20–36.

Altman et al. Paper THEI in *Conference on Laser & Electro Optical Systems*, May 1976.
McMahon et al. "Distributive Tee Couplers" *Applied Physics Letters* vol. 28, No. 7, Apr. 1976, pp. 396–398.
Hudson et al. "The Star Coupler..." *Applied Optics*, vol. 13, No. 11, Nov. 1974, pp. 2540–2545.

*Primary Examiner*—Stewart J. Levy
*Attorney, Agent, or Firm*—R. S. Sciascia; Philip Schneider; Melvin L. Crane

[57] ABSTRACT

A planar, optical star and access coupler for multiterminal communication systems which use multimode fibers as the transmission line either as a plurality of single fiber lines, in multichannel fiber cable or in minibundles. The fibers are placed in a row so that the core ends abut the end of a high-aspect angle rectangular cross section clad ribbon fiber which is preferably not as thick as the diameter of the core of the individual fibers for optimum packing fraction loss. Optical radiation, such as from a laser or light-emitting diode, entering the ribbon-fiber mixer element from all of the fibers on one end will be mixed by the ribbon fiber and be transmitted equally on each of the output fibers. Also, radiation from any one fiber will be divided equally between all of the transmission fibers on the opposite end of the ribbon fiber.

9 Claims, 4 Drawing Figures

PLANAR FIBER OPTIC STAR AND ACCESS COUPLER

BACKGROUND OF THE INVENTION

This invention is directed to star and access couplers for multimode optical fibers and waveguides and more particularly to couplers for minibundles, multichannel fiber cable, and planar single-fiber lines.

It is well known in the art that optical communication systems have been formed by use of optical waveguides in the form of bundles of multimode fibers (more than 18 fibers per bundle). Optical couplers have been provided which will direct optical radiation into and from the above. The present state of the art involves multichannel fiber cable with a small number of fibers as well as single fiber cable. The prior-art star and access couplers for multiterminal communication systems are not suitable for single fiber systems because they are designed for systems where each individual fiber is not important. These fibers are not individually available for inspection and because the input and output fibers are used in bundles, there is a large packing fraction loss between the fibers and their couplers. Further, prior-art couplers for multimode fibers are cylindrical and of such a diameter as to include the fibers and the low-index cladding.

SUMMARY OF THE INVENTION

This invention makes use of planar coupling geometry to form star couplers and data-bus access couplers. The fibers from the transmission-line cable are assembled side-by-side along the width of a flat, rectangular in cross section, ribbon-fiber mixing element to form a planar optical coupler. Information may be transmitted from separate inputs, mixed in the ribbon fiber and propagated on all output fibers. Information may be added and removed at each end of the coupler and the coupler may be bidirectional.

DETAILED DESCRIPTION

Figure 1:
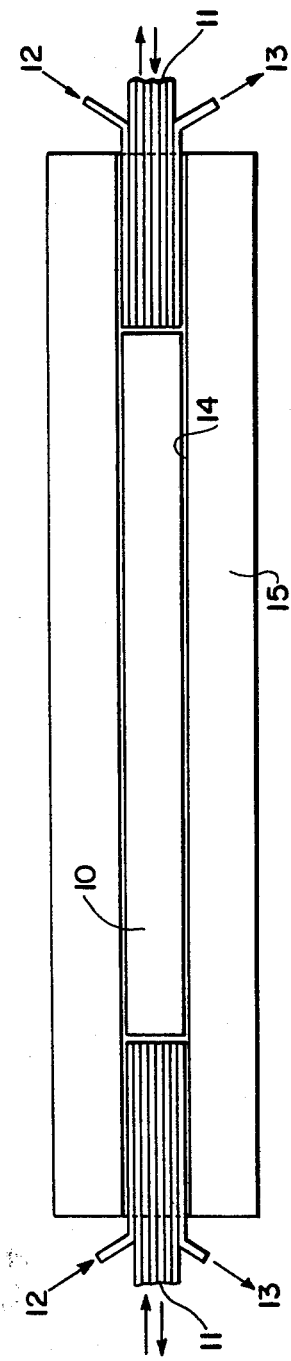
FIG. 1 is a schematic illustration of a planar access coupler using a ribbon fiber.

FIG. 1 illustrates a planar access bidirectional coupler for a six-fiber transmission line. As shown, the coupler includes a flat, high-aspect-angle rectangular cross section thin, ribbon-fiber mixing element 10 with a six-fiber (side-by-side) transmission line 11 connected optically to each end of the mixing element. A single input fiber 12 and single output fiber 13 is provided on each end for adding input information to the transmission line and for receiving information from the six-fiber transmission line. Each of the fibers in the transmission line and the mixer element include a cladding, as is well known in the art. The mixing-element ribbon fiber is drawn by standard fiber-drawing techniques and then short sections are prepared by the score-and-break technique.

The ends of the fibers at each end of the ribbon fiber and the ribbon fiber 10 are supported in a substantially rectangular groove 14 in a support member 15. The support member may be made of glass, plastic, or any other suitable material. The thin-ribbon fiber has a thickness which is less than the diameter of the fiber transmission line, shown more clearly in FIG. 2. Therefore, a shim 16 is placed along the length of the ribbon fiber to position the ribbon fiber at its proper abutting alignment with respect to the ends of the fiber transmission line. The shim 16 supports the ribbon fiber on the bottom thereof and has a thickness substantially the same as the thickness of the cladding on the fibers. An aluminum foil spacer 17 is provided to center the ribbon fiber in the groove. With the use of the alignment shim and spacer, the cores of the transmission line fibers will align with the mixer ribbon and radiation will pass directly from one into the other. Fibers in the transmission line such as used herein have an outside diameter of about 125 $\mu$m and the ribbon fiber has a thickness of about 80 $\mu$m with a length of about one inch and the width is sufficient to extend beyond the planar width of all the transmission line fibers. A suitable transmission line cable is a low-loss step-index Corning Coreguide Cable. It has been determined that with the end finish of all fibers prepared by the score-and-break method and with index-matching fluid used to reduce interface losses, the transmission line-to-transmission line throughput loss is 6 dB including ½ to 1 dB of fiber-to-fiber coupling loss. The fibers may be glued in place to prevent relative movement between the fibers and the ribbon mixer element.

The planar geometry allows fibers to be positioned on an individual basis and since the thickness of the ribbon fiber does not have to be thicker than the fiber core, a superior packing fraction is possible with a planar approach than with a two-dimensional geometry. With a planar geometry, the packing fraction is $\pi(d_c/d_f)/4$ where $d_c$ is the core diameter and $d_f$ is the outside diameter of the fiber used.

Figure 2:
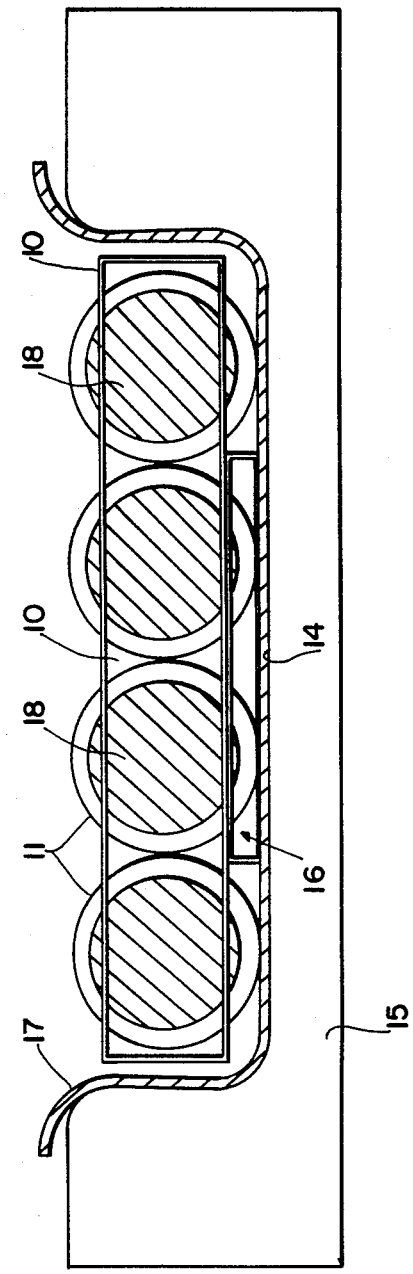
FIG. 2 is a schematic drawing showing in greater detail the coupling between single fibers and a ribbon fiber.

As shown in FIG. 2, the mixer element 10 is thin, its thickness being less than that of the diameter of the core 18 of the fibers 11 of the transmission line. Thus, the radiation of each transmission minibundle, as shown in FIG. 1, on passing through the mixer element 10 will be mixed together and exit with mixed radiation being transmitted by each of the transmission lines 11 on the opposite end of the mixer element. The mixed radiation may also be received by the detector 13 on the opposite side of the mixer element from that of the input from each transmission line. Also, additional radiation may be added by use of an input fiber 12 on opposite ends of the mixer element. The radiation added will be mixed with the radiation passing through the mixer from the fiber transmission line on the same side as that of the source and directed into the fiber transmission line and the detector line on the opposite end of the mixer element.

Figure 3:
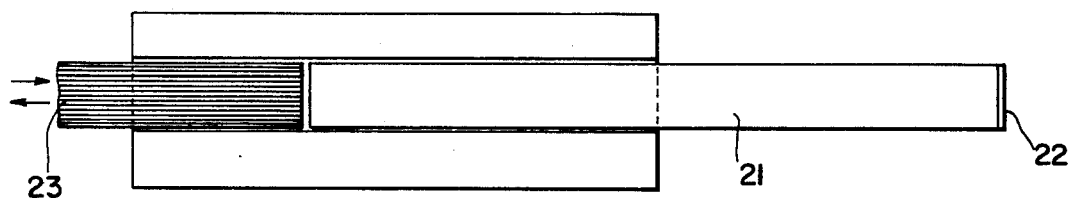
FIG. 3 is a schematic illustration of a planar star coupler.

FIG. 3 illustrates a planar star coupler including a ribbon-fiber mixing element 21 which has one end prepared and provided with a mirrored surface 22 evaporated thereon which reflects incident radiation back through the mixing element. As shown, individual side-by-side fibers 23 are secured to abut the non-mirrored end of the ribbon-fiber mixing element. Radiation entering the ribbon-fiber mixer element 21 from any one fiber is distributed to all the other fibers by passing through the ribbon-fiber mixer element and reflected back to the other fibers. A reflection-mode star coupler such as shown has been made with low-loss graded-index and step-index Corning fibers. With 30 such fibers, as shown, an 81 μm by 2972 μm, rectangular-cross-section, ribbon-fiber mixing element with a length of three inches may be used.

It has been determined that ribbon fibers serve as a convenient, very-low-transmission-loss, mixing or scramber element. The number of fibers used in the planar star coupler is limited by the allowable aspect ratio of the ribbon fiber which is about 50:1 so that, with one fiber per terminal, a star could be made for a maximum of 30–36 terminals.

Figure 4:
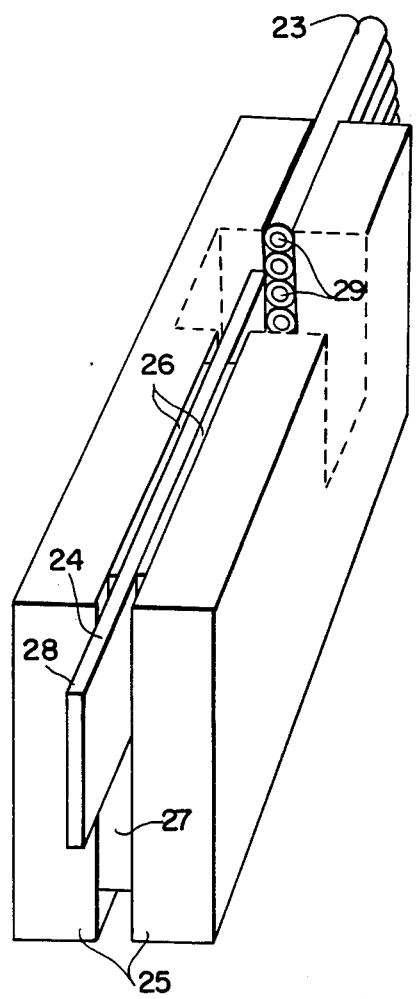
FIG. 4 is a perspective drawing showing in greater detail the coupling arrangement of a planar star coupler.

FIG. 4 shows an assembly technique for the star coupler where the fibers 23 and the ribbon-fiber mixing element 24 are placed in between two glass slides 25, the ribbon fiber having a mirrored end 28. Since the glass slides 25 extend along the length of the fibers 23 which are larger in outside diameter than the thickness of the ribbon fiber, metal shims 26 are placed on each side of the ribbon fiber to make up the difference in thickness. By placing the metal shims on opposite sides of the ribbon fiber, the glass plates 25 are parallel with each other. As shown, a metal shim 27 having the thickness of the spacing between the glass plates is placed under the edge of the ribbon fiber to aid in securing the ribbon fiber in abutting alignment with the cores 29 of the fibers 23. The metal shims 26 and 27 further aid in supporting the ribbon fiber since the ribbon fiber shown in FIG. 4 has a thickness of 0.003 inch and the outside diameter of the optical fibers is 0.005 inch. The glass plates of the coupler shown in FIG. 4 may be cut out in the area shown by dotted lines in order to aid in assembling the coupler and securing the ends of the fibers in abutting relationship with the ribbon-fiber mixer element 24.

The planar geometry of the described coupler leaves all the fibers visible and allows each one to be inspected in place. The ribbon fiber serves as a convenient, very-low-transmission-loss mixing or scrambling element. The fibers do need to be closely butted against the ribbon fiber for coupling; however, as long as the ribbon fiber is wide enough, the alignment tolerances are not critical.

The optical communication couplers set forth herein are appropriate for multiterminal fiber optic data communications systems which use cables incorporating a small number of multimode fibers.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A planar fiber optic star and access coupler element for use with minibundles of multimode fibers or single fibers as the transmission line which comprises:
   a short length of high-aspect-angle, clad ribbon fiber which is rectangular in cross section along both width and length dimensions, and is in end-to-end abutting relationship with said transmission line,
   said clad ribbon fiber aligning with said transmission line such that all radiation is transmitted from said transmission line into the adjacent end of said clad ribbon fiber or from said ribbon fiber to the adjacent end of said transmission line except for packing fraction losses.

2. A coupler as claimed in claim 1 wherein:
   one end of said ribbon fiber is mirrored to reflect radiation back through said ribbon fiber.

3. A coupler as claimed in claim 1 in which
   said ribbon fiber has a thickness of about 82 μm and a width of about 911 μm.

4. A planar coupler for optical fibers which comprises:
   a flat, ribbon-fiber mixing element having a substantially rectangular cross section; and
   a minibundle comprising a plurality of transmission-line fibers secured in end-to-end abutting relationship with said ribbon-fiber mixing element for transmission of optical radiation into and from said mixer element,
   each of said transmission line fibers including a cladding surrounding a core,
   said ribbon fiber having a cladding surrounding a rectangular core,
   said ribbon fiber having a core thickness substantially the same as the core diameter of each of said transmission line fibers and a width which is substantially the same as the width of the total number of said fibers,
   said transmission-line fibers lying next to one another in a plane with their ends abutting an end of said ribbon fiber,
   the plane containing the centers of the cores of the fibers substantially cutting in half the small dimension of the rectangular cross section of the ribbon fiber.

5. A planar coupler as claimed in claim 4 which comprises:
   a fiber minibundle secured in abutting relationship with each end of said mixer element through which radiation is transmitted bidirectionally.

6. A planar coupler as claimed in claim 4 in which:
   said ribbon-fiber mixing element includes a mirrored surface covering one end thereof.

7. A planar coupler as claimed in claim 4 which includes:
   a support member; and
   a groove for positioning the optical fibers with respect to the ribbon-fiber mixing element.

8. A planar coupler as claimed in claim 5 which comprises:
   a separate source inlet fiber and detector outlet fiber opposite each end of said ribbon-fiber mixing element for adding and receiving optical signals.

9. A planar coupler as claimed in claim 6 in which:
   said ribbon-fiber mixing element and said transmission-line fibers are secured in alignment between parallel glass slides.

* * * * *